US012540502B2

(12) United States Patent
Wilcox

(10) Patent No.: US 12,540,502 B2
(45) Date of Patent: Feb. 3, 2026

(54) FENESTRATION THERMAL BREAK DESIGN

(71) Applicant: Arconic Technologies LLC, Pittsburgh, PA (US)

(72) Inventor: Leonard Wilcox, Suwanee, GA (US)

(73) Assignee: Arconic Technologies LLC, Pittsburgh, PA (US)

(*) Notice: Subject to any disclaimer, the term of this patent is extended or adjusted under 35 U.S.C. 154(b) by 184 days.

(21) Appl. No.: 18/527,000

(22) Filed: Dec. 1, 2023

(65) Prior Publication Data

US 2024/0209679 A1 Jun. 27, 2024

Related U.S. Application Data

(60) Provisional application No. 63/476,881, filed on Dec. 22, 2022.

(51) Int. Cl.
*E06B 3/263* (2006.01)

(52) U.S. Cl.
CPC .................... *E06B 3/26305* (2013.01); *E06B 2003/26309* (2013.01)

(58) Field of Classification Search
CPC .. E06B 1/325; E06B 3/26301; E06B 3/26303; E06B 3/26305; E06B 3/26307;
(Continued)

(56) References Cited

U.S. PATENT DOCUMENTS 4,115,972 A * 9/1978 Varlonga ............. E06B 3/26307 52/204.593
4,157,641 A * 6/1979 Hasselbacher ........ F16B 5/0664 52/843

(Continued)

FOREIGN PATENT DOCUMENTS

DE 3033206 A1 3/1982
DE 3203631 A1 8/1983

(Continued)

OTHER PUBLICATIONS

Extended European Search Report from corresponding EP Application No. 23215159.7 mailed Mar. 18, 2024.

(Continued)

*Primary Examiner* — Kyle J. Walraed-Sullivan
(74) *Attorney, Agent, or Firm* — Vorys, Sater, Seymour and Pease LLP

(57) ABSTRACT

A profile for a fenestration system includes first and second members, and a thermal break extending between the first and second members. The thermal break is coupled to the first member at a thermal break interconnection that includes a tab extending laterally from a body, the tab including a head extending from the body and a stem extending from the head. A channel is defined between upper and lower flanges of the first member and provides a first chamber sized to receive the head, and a second chamber extending from the first chamber and sized to receive the stem. The head is larger than the stem, and the first chamber is larger than the second chamber. The thermal break is temporarily secured to the channel by advancing the tab into the channel, and permanently secured to the channel by crimping the flanges against the tab.

16 Claims, 2 Drawing Sheets

(58) Field of Classification Search
CPC ........... E06B 3/273; E06B 2003/26309; E06B 2003/26312; E06B 2003/2635; E06B 2003/26379; E06B 2003/26349; E06B 2003/26352; E06B 2003/26358
See application file for complete search history.

(56) References Cited

U.S. PATENT DOCUMENTS

| | | | | | |
|---|---|---|---|---|---|
| 4,272,941 | A * | 6/1981 | Hasselbacher | E06B 3/26307 52/844 |
| 4,338,753 | A * | 7/1982 | Janke | E06B 3/26307 52/204.593 |
| 9,068,344 | B2 * | 6/2015 | McKenna | E06B 3/16 |
| 2005/0115183 | A1 * | 6/2005 | Rawlings | E06B 3/2675 52/578 |
| 2017/0234058 | A1 * | 8/2017 | Lebron | E06B 3/306 52/204.5 |
| 2020/0032575 | A1 * | 1/2020 | Koster | E06B 3/9616 |

FOREIGN PATENT DOCUMENTS

| | | | | | |
|---|---|---|---|---|---|
| DE | 3436439 | A1 * | 4/1986 | E04F 3/26 |
| EP | 0943775 | A1 | 9/1999 | |
| EP | 2055883 | A2 * | 5/2009 | E06B 3/26347 |
| EP | 2952668 | A1 * | 12/2015 | E06B 1/16 |
| JP | 2010013926 | A * | 1/2010 | E06B 3/26303 |

OTHER PUBLICATIONS

Communication pursuant to Article 94(3) EPC issued May 6, 2025, in European Patent Application No. 23215159.7, 5 pages.

* cited by examiner

FENESTRATION THERMAL BREAK DESIGN

CROSS-REFERENCE TO RELATED APPLICATIONS

The present application is a U.S. non-provisional patent application claiming priority to U.S. Provisional Patent Appln. Ser. No. 63/476,881, filed on Dec. 22, 2022, the contents of which are hereby incorporated by reference in their entirety.

FIELD OF THE DISCLOSURE

The present disclosure is related to fenestration systems and, more particularly, to an improved thermal break profile for mating with profile extrusions.

BACKGROUND

The window and door industry is sometimes referred to as the "fenestration" industry, and common fenestration systems include, but are not limited to, window assemblies, door assemblies, storefront framing, curtain walls, window walls, sliding doors, fixed vents, glazed roofing assemblies, any combination thereof, and others. Aesthetic considerations play an important part in the architectural design of fenestration systems, but the overall energy efficiency of a building an increasingly important factor in architectural design. Consequently, there is a continued demand for building features and methods of construction that improve energy efficiency.

Most commercial fenestration systems utilize frames made of metal, such as aluminum or an aluminum alloy. Metal frames are particularly good thermal conductors. Thus, improved and/or alternative structures and methods for controlling the heat transfer characteristics of fenestration systems while achieving aesthetic design objectives remain desirable.

One solution to improving heat transfer characteristics in fenestration systems is to place a thermal separation or separator between inner and outer component structures. Such thermal separators, often referred to as "thermal breaks," may be made of materials that exhibit low thermal conductivity.

SUMMARY OF THE DISCLOSURE

Embodiments disclosed herein include a profile for a fenestration system where the profile includes a first member and a second member offset from the first member and thereby defining an inner space therebetween, and a thermal break arranged within the inner space and extending between the first and second members. The thermal break may be operatively coupled to the first member at a thermal break interconnection that includes a tab extending laterally from a body of the thermal break and including a head extending from the body and a stem extending from the head, and a channel defined by upper and lower flanges of the first member, the channel providing a first chamber sized to receive the head, and a second chamber extending from the first chamber and sized to receive the stem. The head may exhibit a larger cross-section than the stem, and a size of the first chamber may be larger than a size of the second chamber, and the thermal break is temporarily secured to the channel by advancing the tab into the channel, and permanently secured to the channel by crimping the upper and lower flanges against the tab. In a further embodiment of the profile, the channel transitions between the first and second chambers at a lateral protrusion defined on one or both of the upper and lower flanges, and wherein the head engages the lateral protrusion when advancing the tab into the channel. In another further embodiment of the profile, the thermal break interconnection further includes one or more grooves defined on at least one of the tab and the channel. In another further embodiment of the profile, the one or more grooves comprise one or more first grooves defined on an outer surface of the stem, and one or more second grooves defined on an inner surface of the second chamber. In another further embodiment of the profile, the one or more grooves comprise one or more first grooves defined on an outer surface of the head, and one or more second grooves defined on an inner surface of the first chamber. In another further embodiment of the profile, the thermal break interconnection further includes an adhesive applied at an interface between the tab and the channel. In another further embodiment of the profile, the thermal break interconnection further includes one or more grooves defined on at least one of the tab and the channel, and wherein the adhesive flows into the one or more grooves to strengthen the thermal break interconnection. In another further embodiment of the profile, the fenestration system comprises a commercial or residential fenestration system selected from the group consisting of a window, a door, storefront framing, a curtain wall assembly, a window wall, a conservatory, a balcony, a glazed roofing system, a sliding door, a sliding window, a window assembly, a door assembly, a fixed vent, and any combination thereof.

Embodiments disclosed herein may further include a thermal break for a profile of a fenestration system, the thermal break may include a body having opposing first and second ends and extending along a centerline, and a tab provided at each end and extending laterally from the body along the centerline, and the tab including a head extending from the body, and a stem extending from the head. The head may exhibit a larger cross-section than the stem, and the head and the stem may be sized to be received and secured within a channel provided by the profile of the fenestration system, the channel defining a first chamber sized to receive the head and a second chamber sized to receive the stem. In a further embodiment of the thermal break, the tab extends continuously along an axial length of the thermal break. In another further embodiment of the thermal break, the cross-section of the head increases in a direction laterally away from the body. In another further embodiment of the thermal break, the cross-section of the stem is constant in a direction laterally away from the head. In another further embodiment of the thermal break, the thermal break further includes one or more grooves defined on the tab. In another further embodiment of the thermal break, the one or more grooves are defined on the stem. In another further embodiment of the thermal break, the one or more grooves include an end groove defined on a lateral end of the stem. In another further embodiment of the thermal break, the thermal break is made of a material having a thermal conductivity less than the thermal conductivity of the thermal break.

Embodiments disclosed herein may also include a method of assembling a profile for a fenestration system, the method may include providing first and second members of the profile, and arranging a thermal break within an inner space defined between the first and second members, the thermal break including a body having opposing first and second ends and extending along a centerline, and first and second tabs provided at the first and second ends, respectively, and extending laterally in opposite directions from the body along the centerline, each tab including a head extending from the body, and a stem extending from the head, wherein the head exhibits a larger cross-section than the stem. The method may further include advancing the first and second tabs into first and second channels, respectively, provided by the first and second members, respectively, wherein each channel is defined by upper and lower flanges, temporarily securing the thermal break to the first and second channels by receiving the first and second tabs into the first and second channels, respectively, and crimping the upper and lower flanges of each channel against the first and second tabs, respectively, and thereby permanently securing the thermal break to the first and second members. In another embodiment of the method, each channel provides a first chamber sized to receive the head, and a second chamber extending from the first chamber and sized to receive the stem, and wherein advancing the first and second tabs into the first and second channels, respectively, comprises advancing the head into the first chamber and advancing the stem into the second chamber until the head engages a lateral protrusion defined on one or both of the upper and lower flanges. In another further embodiment of the method, advancing the first and second tabs into the first and second channels comprises forming an interference fit between the second chamber and the stem. In another further embodiment of the method, advancing the first and second tabs into the first and second channels, respectively, is preceded by applying an adhesive at an interface between the first and second tabs and the first and second channels, respectively.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to fenestration systems and, more particularly, to an improved thermal break profile for mating with profile extrusions.

The embodiments described herein are directed to the creation of a temporary, rigid pre-assembly of thermal break components in a composite member or "profile" for a fenestration system prior to running the profile through a crimping or rolling operation to thereby make the connection sure. As described herein, the thermal breaks disclosed include a continuous tab, which helps increase the mechanical interlock between the thermal break and the adjacent profile extrusion. The interlock between the continuous tab and the adjacent profile extrusion allows the preassembled component to remain together while being transferred to a crimping machine and operation. After the crimping operation, the composite profile has greater structural strength because of the continuous tab. The example thermal break interconnections disclosed herein may help increase the structural strength of the composite profile of an assembled fenestration system.

Figure 1:
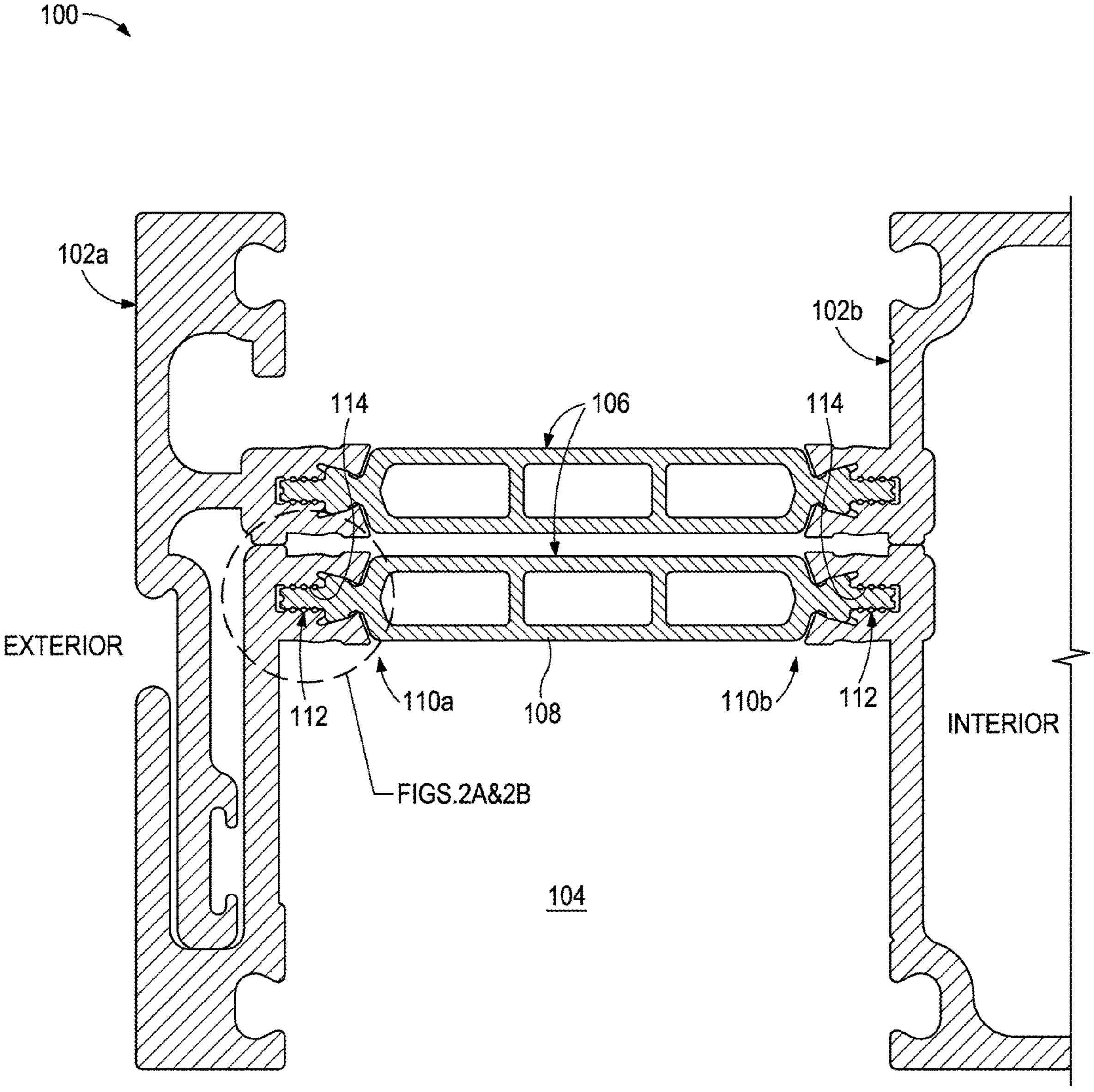
FIG. 1 is a cross-section, side view of an example profile, according to one or more embodiments.

FIG. 1 is a cross-section, side view of an example composite member or "profile" 100, according to one or more embodiments. The profile 100 may form part of or otherwise be incorporated into any type of commercial or residential fenestration system including, but not limited to, windows, doors, storefront framing, curtain wall assemblies, window walls, conservatories, balconies, glazed roofing systems, sliding doors, sliding windows, window assemblies, door assemblies, fixed vents, or any combination thereof. The profile 100 may be a designed to be oriented vertically, horizontally, or at any angle therebetween.

As illustrated, the profile 100 can include a first or "exterior" member 102*a* intended to be generally exposed to the exterior of a building, and a second or "interior" member 102*b* intended to be generally exposed to the interior of the building. Each member 102*a,b* may comprise a rigid extrusion made of aluminum, an aluminum alloy, or other rigid metals and metal alloys. In some embodiments, the profile 100 may further include a third or $n^{th}$ "intermediate" member (not shown) that interposes the exterior and interior members 102*a,b*. In some embodiments, one or both of the exterior and interior members 102*a,b* may comprise a monolithic part, but may alternatively be made up of two or more component parts that interlock or otherwise interconnect or engage with one another, as generally depicted in FIG. 1.

The exterior and interior members 102*a,b* cooperatively define an inner space 104 between the two components. The inner space 104 may be used for accommodating an infill (not shown) of a given thickness to be included in the fenestration system. The infill may comprise, but is not limited to, glass, a foam panel, a structural panel, or a connection to another profile. The inner space 104 generally extends along the entire length of the profile 100.

As illustrated, one or more thermal breaks 106 may be arranged within the inner space 104 and secured to the profile 100 to connect the members 102*a,b* together. In the illustrated embodiment, two thermal breaks 106 are depicted extending between the exterior and interior members 102*a, b*, but more or less than two may be employed in the profile 100, without departing from the scope of the disclosure. As illustrated, the two thermal breaks 106 may be substantially the same and otherwise exhibits similar design characteristics, but may alternatively be different. In some applications, the two thermal breaks 106 may be jointly referred to as a single thermal break that extends between and interconnects the exterior and interior members 102*a,b*.

Each thermal break 106 may comprise a rigid or semi-rigid structure capable of being secured to the profile 100 within the inner space 104. Consequently, the thermal breaks 106 help enhance the mechanical strength of the profile 100. Moreover, however, the thermal breaks 106 serve to improve the thermal performance of the profile 100 by preventing thermal energy loss between the exterior and interior members 102*a,b*. To that end, the thermal break(s) 106 may be made of a material having a thermal conductivity that is less than the thermal conductivity of the exterior and interior members 102*a,b*. Example materials for the thermal breaks 106 include, but are not limited to, a polyurethane foam, polyethylene terephthalate (PET), polyamide, nylon, acrylonitrile butadiene styrene (ABS), a polymer, or the like.

In the illustrated embodiment, the thermal breaks 106 are configured to be secured between the exterior and interior members 102*a,b* via a crimped or rolled dovetail engagement. More specifically, each thermal break 106 provides a body 108 having opposing first and second ends 110*a* and 110*b*. As illustrated, an axial extension or "tab" 112 may be provided at each end 110*a,b* of the thermal break 106 and extends laterally from the body 108. The tabs 112 may alternately be referred to as a "leg" or a "fin". In at least one embodiment, the tabs 112 extend continuously along the axial (longitudinal) length of the thermal break 106, but could alternatively extend discontinuously along the axial (longitudinal) length of the thermal break 106.

Each tab 112 may be configured to be received within and interconnected with a corresponding channel 114 provided or otherwise defined by the exterior and interior members 102*a,b*. Accordingly, the tab 112 provided at the first end 110*a* of the thermal break 106 may be configured to be received within an adjacent channel 114 provided (defined) by the exterior member 102*a*, while the tab 112 provided at the second end 110*b* may be configured to be received within an adjacent channel 114 provided (defined) by the interior member 102*b*. Once the particular tab 112 is received within the corresponding (adjacent) channel 114, the interconnection between the thermal break 106 and the exterior and interior members 102*a,b* may be made sure by crimping or rolling (collectively referred to herein as "crimping") portions of the channel 114 into locking engagement with the tab 112, which effectively interconnects the exterior and interior portions across the inner space 104.

According to embodiments of the present disclosure, the design and configuration of the tabs 112 and corresponding channels 114 may provide a temporary interlock or interconnection that allows the pre-assembled components (i.e., the tabs 112 received within the channels 114) to remain together while being physically transferred (moved) to a crimping or rolling tool. The interconnection between the thermal break 106 and the exterior and interior members 102*a,b* may then be made sure by crimping down on the tabs 112 at each end 110*a,b*.

Figure 2A:
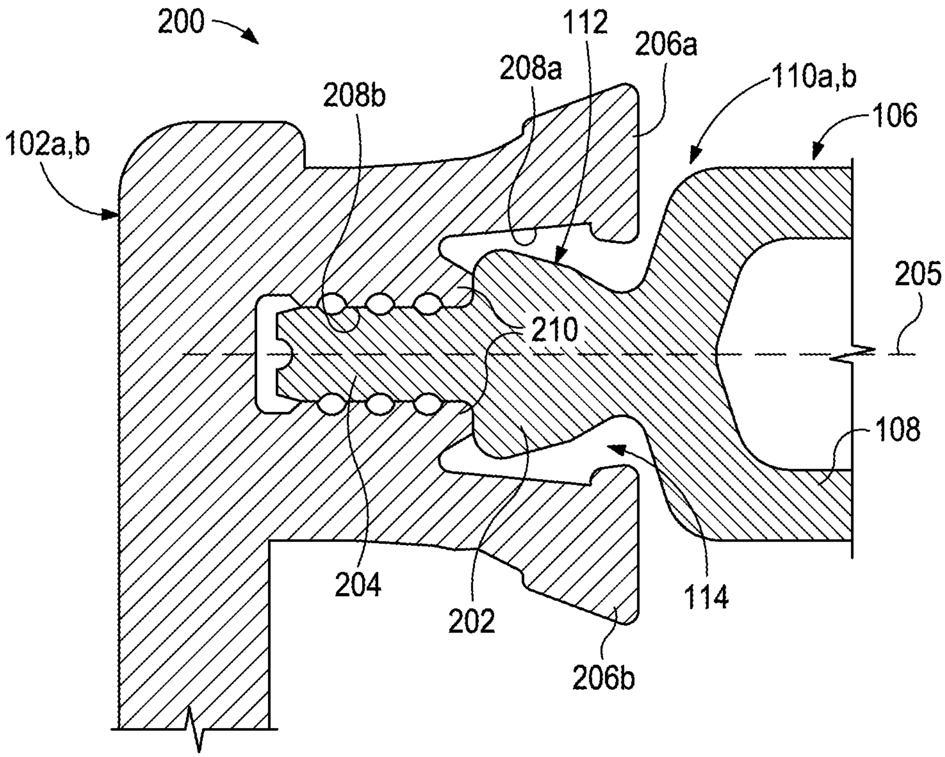
FIGS. 2A and 2B are enlarged cross-sectional side views of an example thermal break interconnection, as indicated in FIG. 1, according to one or more embodiments.
Figure 2B:
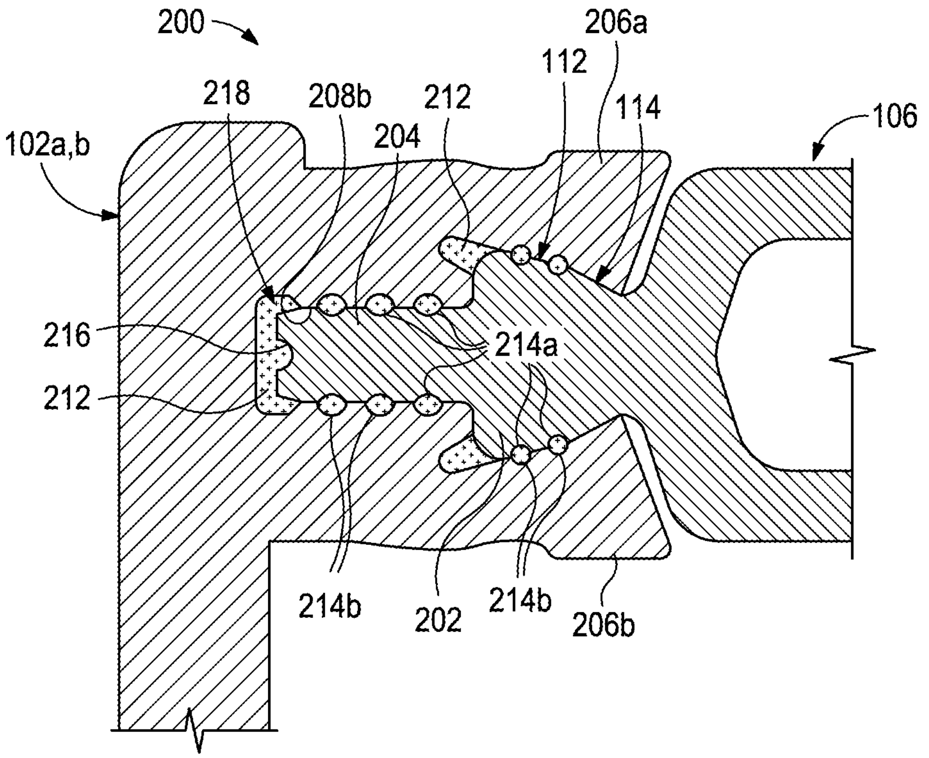

FIGS. 2A and 2B are enlarged cross-sectional side views of an example thermal break interconnection 200, as indicated in FIG. 1, according to one or more embodiments. As illustrated, the thermal break interconnection 200 (hereafter "the interconnection 200") includes a tab 112 of a given thermal break 106 received within a corresponding channel 114 of either the exterior or interior member 102*a,b* of the profile 100 (FIG. 1). FIG. 2A depicts the interconnection 200 in a first or "pre-crimped" or "pre-rolled" state and FIG. 2B depicts the interconnection 200 in a second or "crimped" or "rolled" state.

Referring first to FIG. 2A, as illustrated, the tab 112 includes a head 202 extending laterally from the end 110*a* or 110*b* of the body 108, and a stem 204 extends laterally away from the head 202 and along a centerline 205 of the body 108. The head 202 is enlarged and otherwise exhibits a larger cross-sectional area or volume as compared to the stem 204. In at least one embodiment, the cross-sectional size of the head 202 may increase in a direction laterally away from the body 108 of the thermal break 106. In other embodiments, however, the cross-sectional size of the head 202 may be constant or decrease in the lateral direction away from the body 108, without departing from the scope of the disclosure. In such embodiments, however, the head 202 nonetheless exhibits a larger cross-sectional size as compared to the stem 204. In some embodiments, as illustrated, the cross-section of the stem 204 may be constant in the lateral direction away from the head 202, but could alternatively vary in cross-sectional size in the lateral direction, without departing from the scope of the disclosure.

The channel 114 is sized to receive and mate with the tab 112, including both the head 202 and the stem 204. More particularly, the channel 114 may include or otherwise be defined by a first or "upper" flange 206*a* and a second or "lower" flange 206*b* offset (e.g., laterally, vertically, etc.) from the upper flange 206*a*. The channel 114 comprises a void defined between the upper and lower flanges 206*a,b* and exhibits a size and geometry configured to receive the tab 112. More specifically, in the illustrated embodiment, the channel 114 defines a first chamber 208*a* at its opening sized to receive and mate with the head 202. A second chamber 208*b* extends from the first chamber 208*a* and is sized to receive and mate with the stem 204. Accordingly, the size of the first chamber 208*a* may be larger than the size of the second chamber 208*b* to accommodate the larger size of the head 202 as compared to the stem 204.

In at least one embodiment, the channel 114 transitions between the first and second chambers 208*a,b* at a lateral protrusion 210 defined on one or both of the flanges 206*a,b*. In some embodiments, the lateral protrusion(s) 210 may provide a hard stop for the tab 112. More specifically, when advancing the tab 112 into the channel 114, the enlarged cross-section of the head 202 may engage the lateral protrusion 210, which stops the tab 112 from advancing further into the channel 114.

In some embodiments, the second chamber 208*b* may exhibit a geometry or size that is the same as or slightly smaller than the geometry or size of the stem 204. Consequently, advancing the stem 204 into the channel 114 may form an interference or snug fit with the second chamber 208*b* such that an amount of retraction force may be required to subsequently remove the stem 204 from the second chamber 208*b*.

Accordingly, receiving the tab 112 within the channel 114 may provide a degree of stability and rigidity to the interconnection 200 prior to crimping the flanges 206*a,b* onto the tab 112, which operationally secures the thermal break 106 to the exterior or interior member 102*a,b* of the profile 100 (FIG. 1). In the pre-crimped or pre-rolled state, receiving the tab 112 within the channel 114 substantially restricts lateral and rotational movement (i.e., tipping) of the thermal break 106 or the exterior and interior members 102*a,b* that make up the pre-assembly. Those skilled in the art will readily appreciate that this assists in helping to prevent the preassembly from separating or inadvertently tipping (rotating) out of engagement with each other while transferring the pre-assembly to a crimping or rolling machine.

In FIG. 2B, the interconnection 200 has been "crimped" or "rolled" and otherwise transitioned to the crimped state by crimping the flanges 206*a,b* onto the tab 112, and thereby permanently securing the thermal break 106 to the exterior or interior member 102*a,b*. The crimping operation can be undertaken by conventional or known crimping or rolling machines or devices, which will not be described herein. After the crimping operation, and partly because of the continuous tab 112, the interconnection 200 will exhibit a higher structural strength as compared to conventional thermal break interconnections.

In some embodiments, the interconnection 200 may be enhanced by including an adhesive 212 applied at the interface between the tab 112 and the channel 114. Examples of the adhesive 212 include, but are not limited to, a glue (e.g., cyanoacrylate), an acrylic adhesive, an epoxy, or any combination thereof, but the adhesive 212 may comprise any type of glue capable of strengthening the interconnection 200. In some embodiments, the adhesive 212 may be applied (deposited) within the channel 114 prior to advancing the tab 112 into the channel 114. In other embodiments, or in addition thereto, the adhesive 212 may be applied to the outer surfaces of the tab 112. In yet other embodiments, the adhesive 212 may be applied to both surfaces of the channel 114 and the tab 112, without departing from the scope of the disclosure.

In at least one embodiment, to further strengthen the interconnection 200, one or more grooves 214 may be defined on the tab 112, the channel 114, or both the tab 112 and the channel 114. More particularly, as illustrated, one or more first grooves 214*a* may be defined on the outer surface of the stem 204, and one or more second grooves 214*b* may be defined on the inner surface of the channel 114, such as within the second chamber 208*b*. The first grooves 214*a* may extend longitudinally along all or a portion of the axial length of the thermal break 106, and the second grooves 214*b* be may extend longitudinally along all or a portion of the axial length of the exterior or interior members 102*a,b*.

While the first grooves 214*a* are shown defined on the stem 204, it is contemplated herein to include similar grooves 214*a* defined on the head 202, or both on the head 202 and the stem 204. Similarly, while the second grooves 214*b* are shown defined on the inner surface of the second chamber 208*b*, it is contemplated herein to provide the second grooves 214*b* within the first chamber 208*a*, or within both the first and second chambers 208*a,b*, without departing from the scope of the present disclosure.

In some embodiments, as illustrated, one or more of the grooves 214*a,b* may axially align such that corresponding pockets (voids) are defined at the interface between the stem 204 and the inner wall of the second chamber 208*b*, and/or at the interface between the head 202 and the inner wall of the first chamber 208*a*. The pockets defined by aligned grooves 214*a,b* may be filled with the adhesive 212 during assembly of the interconnection 200. In other embodiments, however, one or more of the grooves 214*a,b* may axially misalign such that smaller pockets (voids) are defined at the interface between the stem 204 and the inner wall of the second chamber 208*b*, and/or at the interface between the head 202 and the inner wall of the first chamber 208*a*. Accordingly, the grooves 214*a,b* may prove advantageous in allowing for more surface area contact with the adhesive 212 and for mechanical interlocking with the adhesive 212, which provides increased structural strength to the interconnection 200.

In some embodiments, one or more end grooves 216 (one shown) may be defined on a lateral end 218 of the tab 204. More specifically, the end groove 216 may be defined in the end of the stem 204. Similar to the first grooves 214*a,b*, the end groove(s) 216 may prove advantageous in be able to be filled with the adhesive 212, and thereby enhancing the surface area contact with the adhesive 212 to provide increased structural strength to the interconnection 200.

Accordingly, the interconnection 200 provides a continuous (or non-continuous) tab 112 that increases the mechanical interlock between the thermal break 106 and exterior or interior member 102*a,b* of the profile 100 (FIG. 1). When tab 112 is inserted (advanced) into an adjacent channel 114, the tab 112 helps to restrict lateral and rotational (tipping) movement of the components that make up preassembly. This assists in transferring the pre-assembly to a crimping machine without the pre-assembly coming apart (separating). After the crimping operation, the interconnection 200 has greater structural strength because of the continuous tab 112.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

What is claimed is:

1. A profile for a fenestration system, comprising:

a first member and a second member offset from the first member and thereby defining an inner space therebetween;

a thermal break arranged within the inner space and extending between the first and second members, the thermal break being operatively coupled to the first member at a thermal break interconnection that includes:

a tab extending laterally from a body of the thermal break and including a head extending from the body and a stem extending from the head, the stem including an outer surface including a first side, a second side, a lateral end, and a plurality of first grooves defined on the first and second sides; and a channel defined by upper and lower flanges of the first member, the channel providing a first chamber sized to receive the head, a second chamber extending from the first chamber and sized to receive the stem, and a plurality of second grooves defined on an inner surface of the second chamber;

wherein the inner surface of the second chamber contacts the first and second sides of the stem when the stem is received within the second chamber, wherein each first groove is axially aligned with a corresponding second groove when the stem is received in the second chamber, thereby forming corresponding pockets at an interface between the stem and the inner surface of the second chamber;

wherein the head exhibits a larger cross-section than the stem, a size of the first chamber is larger than a size of the second chamber, and wherein the thermal break is temporarily secured to the channel by advancing the tab into the channel, and permanently secured to the channel by crimping the upper and lower flanges against the tab.

2. The profile of claim 1, wherein the channel transitions between the first and second chambers at a lateral protrusion defined on one or both of the upper and lower flanges, and wherein the head engages the lateral protrusion when advancing the tab into the channel.

3. The profile of claim 1, further comprising:

one or more third grooves defined on an outer surface of the head; and one or more fourth grooves defined on an inner surface of the first chamber.

4. The profile of claim 1, wherein the thermal break interconnection further includes an adhesive applied at an interface between the tab and the channel.

5. The profile of claim 4, wherein the adhesive is disposed within the plurality of first grooves to strengthen the thermal break interconnection.

6. The profile of claim 1, wherein the fenestration system comprises a commercial or residential fenestration system selected from the group consisting of a window, a door, storefront framing, a curtain wall assembly, a window wall, a conservatory, a balcony, a glazed roofing system, a sliding door, a sliding window, a window assembly, a door assembly, a fixed vent, and any combination thereof.

7. A thermal break for a profile of a fenestration system, comprising:

a body having opposing first and second ends and extending along a centerline; and a tab provided at each end and extending laterally from the body along the centerline, the tab including a head extending from the body, and a stem extending from the head, the stem including an outer surface including a first side, a second side, a lateral end, and a plurality of first grooves defined on the first and second sides, wherein the head exhibits a larger cross-section than the stem, and wherein the head and the stem are sized to be received and secured within a channel provided by the profile of the fenestration system, the channel defining a first chamber sized to receive the head and a second chamber sized to receive the stem, wherein the first and second sides are in contact with an inner surface of the second chamber when the head and the stem are secured within the channel, and wherein each first groove is axially aligned with a corresponding second groove formed in the inner surface of the second chamber when the stem is received in the second chamber, thereby forming corresponding pockets at an interface between the stem and the inner surface of the second chamber.

8. The thermal break of claim 7, wherein the tab extends continuously along an axial length of the thermal break.

9. The thermal break of claim 7, wherein the cross-section of the head increases in a direction laterally away from the body.

10. The thermal break of claim 7, wherein the cross-section of the stem is constant in a direction laterally away from the head.

11. The thermal break of claim 7, further comprising one or more second grooves defined on the head.

12. The thermal break of claim 7, further comprising an end groove defined on the lateral end of the stem.

13. The thermal break of claim 7, wherein the thermal break is made of a material having a thermal conductivity less than a thermal conductivity of the profile.

14. A method of assembling a profile for a fenestration system, the method comprising:

providing first and second members of the profile;

arranging a thermal break within an inner space defined between the first and second members, the thermal break including:

a body having opposing first and second ends and extending along a centerline; and first and second tabs provided at the first and second ends, respectively, and extending laterally in opposite directions from the body along the centerline, each tab including a head extending from the body, and a stem extending from the head, wherein the head exhibits a larger cross-section than the stem, the stem including an outer surface including a first side, a second side, a lateral end, and a plurality of first grooves defined on the first and second sides;

advancing the first and second tabs into first and second channels, respectively, provided by the first and second members, respectively, wherein each channel includes a first chamber defined by upper and lower flanges configured to receive the head of the respective first and second tabs, and a second chamber configured to receive the stem of the respective first and second tabs, each second chamber having a size configured to form an interference fit with the first and second sides of the stem of the respective first and second tabs;

temporarily securing the thermal break to the first and second channels by receiving the first and second tabs into the first and second channels, respectively, thereby forming an interference fit between the stem of the first and second tabs and the second chamber of the first and second channels, respectively, wherein each first groove is axially aligned with a corresponding second groove formed on an inner surface of the second chamber when the stem is received in the second chamber, thereby forming corresponding pockets at an interface between the stem and the inner surface of the second chamber; and crimping the upper and lower flanges of each channel against the first and second tabs, respectively, and thereby permanently securing the thermal break to the first and second members.

15. The method of claim 14, wherein advancing the first and second tabs into the first and second channels, respectively, comprises:

advancing the head into the first chamber and advancing the stem into the second chamber until the head engages a lateral protrusion defined on one or both of the upper and lower flanges.

16. The method of claim 14, wherein advancing the first and second tabs into the first and second channels, respectively, is preceded by applying an adhesive at an interface between the first and second tabs and the first and second channels, respectively.

* * * * *